(12) United States Patent
Shi

(10) Patent No.: US 9,470,913 B2
(45) Date of Patent: Oct. 18, 2016

(54) INTEGRATED PHOTONIC FREQUENCY CONVERTER AND MIXER

(71) Applicant: The Boeing Company, Chicago, IL (US)

(72) Inventor: Yongqiang Shi, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 418 days.

(21) Appl. No.: 13/932,016

(22) Filed: Jul. 1, 2013

(65) Prior Publication Data

US 2015/0002920 A1  Jan. 1, 2015

(51) Int. Cl.
*G02F 1/01* (2006.01)
*G02F 1/035* (2006.01)
*H04B 10/90* (2013.01)

(52) U.S. Cl.
CPC ............... *G02F 1/01* (2013.01); *H04B 10/90* (2013.01); *H04B 2210/006* (2013.01)

(58) Field of Classification Search
CPC .......... G02F 1/01; H04B 10/64; H04B 10/90
USPC .............................................. 385/3; 359/276
See application file for complete search history.

(56) References Cited

U.S. PATENT DOCUMENTS 5,040,865 A   8/1991  Chen et al.
5,199,086 A * 3/1993  Johnson ................... G02F 1/225
                                                                       385/2
5,422,966 A   6/1995  Gopalakrishnan et al.
2004/0264977 A1* 12/2004  Yap ........................... G02F 2/02
                                                                       398/161

FOREIGN PATENT DOCUMENTS

WO    WO03090385 A2    10/2003

OTHER PUBLICATIONS

X. Steve Yao and Lute Malekx, Optoelectromc Oscillator for Photonic Systems, IEEE J. Quantum Electronics, vol. 32, No. 7, Jul. 1996.
Roger Helkey, Jon C. Twichell, and Charles Cox, III, A Down-conversion Optical Link with RF Gain, IEEE J. Lightwave Technol., vol. 15, No. 6, Jun. 1997.
Yongqiang Shl, Wenshen Wang, and James H. Bechtel, "High Isolation Photonic Microwave Mixer/Link for Wideband Signal Processing and Transmission," J. Lightwave Technol. vol. 21, pp. 12244232 (2003).

(Continued)

*Primary Examiner* — Jerry Blevins
(74) *Attorney, Agent, or Firm* — McDonnell Boehnen Hulbert & Berghoff LLP

(57) ABSTRACT

A system and methods for electro-optical modulation are presented. A first optical signal and a second optical signal are optically coupled to produce a local oscillator signal propagated in two signal paths. The local oscillator signal in the first signal path and the second signal path is electro-optically phase modulated with a radio frequency electrical signal to produce a first phase modulated optical signal and a second phase modulated optical signal respectively. The first phase modulated optical signal and the second phase modulated optical signal are optically coupled to produce an intensity modulated signal comprising an RF frequency of the radio frequency electrical signal frequency mixed by a local oscillator frequency of the local oscillator signal.

15 Claims, 10 Drawing Sheets

(56) References Cited

OTHER PUBLICATIONS

X. Sieve Yao and Lute Maleki, Optoelectronic microwave oscillator, J. Opt. Soc. Am. B, vol. 13, pp. 17251735 (1996).
English Translation of Notice of Reasons for Rejection issued in Japanese Patent Application No. 2014-099365 dated May 29, 2015.
Extended European Search Report EP14175188 mailed Dec. 18, 2014.
Yonqiang Shi et al., "High-Isolation Photonic Microwave Mixer/Link for Wideband Signal Processing and Transmission," Journal of Lightwave Technology, vol. 21, No. 5, pp. 1224-1232 (IEEE May 2003).

* cited by examiner

INTEGRATED PHOTONIC FREQUENCY CONVERTER AND MIXER

FIELD

Embodiments of the present disclosure relate generally to frequency converters and mixers. More particularly, embodiments of the present disclosure relate to opto-electronic frequency converters and mixers.

BACKGROUND

Radio Frequency (RF) conversion requires an RF source and a local oscillator. Current electronic mixers typically employ an RF generator as local oscillator. Many systems such as dielectric resonators require low phase noise sources. Electronic mixing is generally achieved with a chip based circuit. A drawback for chip based circuits is high phase noise when a local oscillator frequency is over 10 GHz due to a large multiplication factor.

SUMMARY

A system and methods for electro-optical modulation are presented. A first optical signal and a second optical signal are optically coupled to produce a local oscillator signal propagated in two signal paths comprising a first signal path and a second signal path. The local oscillator signal in the first signal path and the second signal path is electro-optically phase modulated with a radio frequency electrical signal to produce a first phase modulated optical signal and a second phase modulated optical signal respectively. The first phase modulated optical signal and the second phase modulated optical signal are optically coupled to produce an intensity modulated signal comprising an RF frequency of the radio frequency electrical signal frequency mixed by a local oscillator frequency of the local oscillator signal.

In this manner, an RF oscillator and mixer integrate two important functions for modern RF systems into a single photonic device to expand device functionality and reduce size and weight.

In an embodiment, a method for electro-optical heterodyning optically couples a first optical signal and a second optical signal to produce a local oscillator signal propagated in two signal paths comprising a first signal path and a second signal path. The method further electro-optically phase modulates the local oscillator signal in the first signal path and the second signal path with a radio frequency electrical signal to produce a first phase modulated optical signal and a second phase modulated optical signal respectively. The method further optically couples the first phase modulated optical signal and the second phase modulated optical signal to produce an intensity modulated signal comprising an RF frequency of the radio frequency electrical signal frequency mixed by a local oscillator frequency of the local oscillator signal.

In another embodiment, a system for electro-optical heterodyning comprises: a first optical coupler, a first electro-optical modulator, a second electro-optical modulator, and a second optical coupler. The first optical coupler is configured to optically couple a first optical signal and a second optical signal to produce a local oscillator signal propagated in two signal paths comprising a first signal path and a second signal path. The first electro-optical modulator is configured to electro-optically modulate the local oscillator signal in the first signal path with a radio frequency electrical signal to produce a first phase modulated optical signal. The second electro-optical modulator is configured to electro-optically modulate the local oscillator signal in the second signal path with the radio frequency electrical signal to produce a second phase modulated optical signal. The second optical coupler is configured to optically couple the first phase modulated optical signal and the second phase modulated optical signal to produce an intensity modulated signal comprising an RF frequency of the radio frequency electrical signal frequency mixed by a local oscillator frequency of the local oscillator signal.

In a further embodiment, a method for producing electro-optical modulator configures a first optical modulator to electro-optically modulate an RF stage input optical signal in a first signal path with a radio frequency electrical signal to produce a first RF stage phase modulated optical signal. The method further configures a second optical modulator to electro-optically modulate the RF stage input optical signal in a second signal path with the radio frequency electrical signal to produce a second RF stage phase modulated optical signal. The method further configures an RF stage optical coupler to optically couple the first RF stage phase modulated optical signal and the second RF stage phase modulated optical signal to produce an intensity modulated output signal comprising a frequency of the radio frequency electrical signal in the first signal path and the second signal path.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
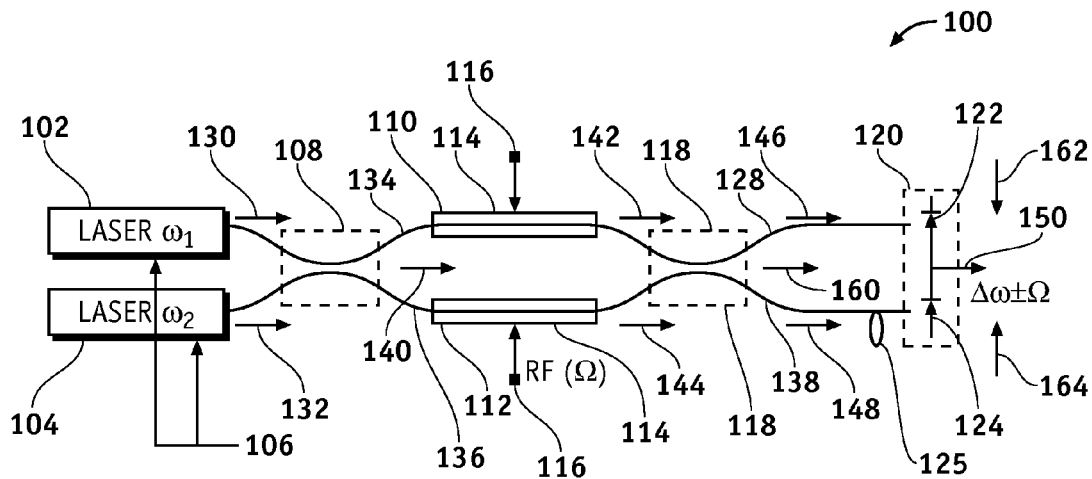
FIG. 1 is an illustration of a widely tunable double-balanced photonic mixer comprising an electro-optical heterodyne according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to heterodyning, modulation, and other functional aspects of the systems (and the individual operating components of the systems) may not be described in detail herein.

Embodiments of the disclosure are described in the context of a non-limiting application, namely, an opto-electronic RF mixer and converter. Embodiments of the disclosure, however, are not limited to such applications, and the techniques described herein may also be utilized in other applications. For example, embodiments may be applicable to an opto-electronic RF modulator, or any other type of special or general purpose opto-electronic device as may be desirable or appropriate for a given application or environment.

As would be apparent to one of ordinary skill in the art after reading this description, the following are examples and embodiments of the disclosure, are not limited to operating in accordance with these examples. Other embodiments may be utilized and changes may be made without departing from the scope of the exemplary embodiments of the present disclosure.

A photonic device such as an opto-electronic oscillator (OEO) offers ultra-low phase noise but currently is a stand-alone unit. Its RF output can be used as a local oscillator (LO) for circuit based mixer, but the matching transformer and other matching circuit often limit the RF bandwidth of the circuit based mixer. On the other hand, the optical output of the OEO offers a unique wideband solution for RF mixing in photonic domain. Photonic mixing can be achieved by introducing an electro-optic modulator in an optical path with RF signals applied to modulation port of the electro-optic modulator. The drawbacks of discrete devices are high insertion loss due to coupling loss and large size due to additional packaging.

An integrated OEO and RF modulator solve the low efficiency and large size problem since an OEO chip and RF modulator are made of the same materials on the same semiconductor chip.

In most cases the purpose of an oscillator is to provide an LO source for frequency conversion. Therefore, it is a natural extension of the LO with an integrated mixer. The embodiments described herein comprise an OEO and mixer integrated on the same semiconductor chip to provide a continuous low loss signal interface and to eliminate additional packaging. Some of benefits of integrating the OEO and the mixer on the same semiconductor chip are low size and weight, high efficiency, and wideband operation, among other benefits.

Embodiments integrate RF oscillator and mixer, two important functions for modern RF systems, into a single photonic device to expand the device functionality and reduce size and weight of the device. Opto-electronic oscillator (OEO) has been a promising RF source due to its ultra-low phase noise characteristics and wideband RF generation capability. Embodiments, add a section comprising electro optic modulator to the optical signal path of the OEO. An RF signal is then applied to the electro optic modulator. The OEO output will serve as local oscillator and mix with the RF to generate intermediate frequency signals for further processing.

FIG. 1 is an illustration of a widely tunable double-balanced photonic mixer 100 (photonic mixer 100) comprising an optical heterodyne according to an embodiment of the disclosure. The photonic mixer 100 may comprise an LO stage comprising a first laser 102, a second laser 104 and a first optical coupler 108; an RF stage comprising a first electro-optical phase modulator 110, a second electro-optical phase modulator 112 and a second optical coupler 118; and a photo detector 120. Electro-optical phase modulator, phase modulator, and optical phase modulator may be used interchangeably in this document.

The first laser 102 is configured to produce a first optical signal 130 comprising a first frequency $\omega_1$ controlled by a control signal 106. The first laser 102 may comprise a semiconductor such as, but without limitation, silicon, a III-V compound comprising at least one group III element (International Union of Pure and Applied Chemistry (IUPAC) group 13) and at least one group V element (IUPAC group 15), or other suitable material. The first laser 102 may operate in a frequency range of the first frequency $\omega_1$ of, for example but without limitation, about 100 THz to about 500 THz, or other suitable operation range. The first optical signal 130 is emitted from the first laser 102 into a first signal path 134/128. Signal path, optical signal path, and optical waveguide signal path may be used interchangeably in this document.

The second laser 104 is configured to produce a second optical signal 132 comprising a second frequency $\omega_2$ controlled by the control signal 106. The second laser 104 may comprise a semiconductor such as, but without limitation, silicon, a III-V compound, or other suitable material. The second laser 104 may operate in a frequency range of the second frequency $\omega_2$ of, for example but without limitation, about 100 THz to about 500 THz, or other suitable operation range. The second optical signal 132 is emitted from the second laser 104 into a second signal path 136/138.

The first signal path 134/128 comprises an optical waveguide that transmits light such as the first optical signal 130 from the first laser 102 into the first optical coupler 108 and through the first electro-optical phase modulator 110 and the second optical coupler 118 to the photo detector 120.

The second signal path 136/138 comprises an optical waveguide that transmits light such as the second optical signal 132 from the second laser 104 into the first optical coupler 108 and through the second electro-optical phase modulator 112 and the second optical coupler 118 to the photo detector 120.

The first optical coupler 108 is configured to optically couple the first optical signal 130 in the first optical waveguide signal path 134 and the second optical signal 132 in the second optical waveguide 136 to produce a local oscillator (LO) optical signal 140. The LO optical signal 140 is transmitted in both the first optical waveguide signal path 134 and the second optical waveguide 136, and comprises an LO frequency $\Delta\omega$. The LO frequency $\Delta\omega$ comprises $|\omega_1-\omega_2|$, i.e., a difference between the first frequency $\omega_1$ of the first optical signal 130 and the second frequency $\omega_2$ of the second optical signal 132. The first optical coupler 108 in combination with the first laser 102 and the second laser 104 provide a local oscillator function that can be controlled by controlling the first frequency $\omega_1$ and the second frequency $\omega_2$. By controlling the first frequency $\omega_1$ and the second frequency $\omega_2$, the LO frequency $\Delta\omega$ may operate in a widely tunable frequency range of, for example but without limitation, about 0 Hz to 1 THz, or other suitable frequency range.

The first electro-optical phase modulator 110 is configured to electro-optically modulate the LO optical signal 140 in the first optical waveguide signal path 134 with a radio frequency electrical signal 116 to produce a first phase modulated optical signal 142. For an optical mixer according to embodiments of the disclosure, the radio frequency electrical signal 116 may comprise, for example but without limitation, a 0 Hz (DC) baseband modulation, or other suitable baseband modulation. For the radio frequency electrical signal 116 comprising a 0 Hz signal, the first phase modulated optical signal 142 may comprise the LO optical signal 140 not changed in frequency, but for example without limitation, amplified, phase shifted, or other non-frequency changing change. In some embodiments, the first electro-optical phase modulator 110 may be omitted, and the LO optical signal 140 passed to the second optical coupler 118 unchanged.

The first electro-optical phase modulator 110 may comprise a semiconductor such as, but without limitation, silicon, a III-V compound, or other suitable material. The modulator may comprise a low Vpi phase modulator (not electro-absorption (EA)). Electro-absorption modulator (EAM) is a semiconductor device which can be used for modulating the intensity of a laser beam via an electric voltage. Its principle of operation may be based on the Franz-Keldysh effect, i.e., a change in the absorption spectrum caused by an applied electric field, which changes the bandgap energy (thus the photon energy of an absorption edge) but usually does not involve the excitation of carriers by the electric field. Improvements in modulator technology can allow higher efficiency (lower drive voltage, or Vpi).

The halfwave voltage, $V\pi$ (or Vpi), of a Mach-Zehnder (MZ) modulator is generally defined as the difference between the applied voltage at which the signals in each branch of the MZ modulator are in phase and the applied voltage at which the signals are $\pi$ radians out of phase. In other words, $V\pi$ is the voltage difference between maximum and minimum output signal power. The voltage required for inducing a phase change of $\pi$ is called the half-wave voltage ($V\pi$). For a Pockels cell, the half-wave voltage ($V\pi$) may be hundreds or even thousands of volts, so that a high-voltage amplifier may be required. Suitable electronic circuits can switch such large voltages within a few nanoseconds, allowing use of EOMs as fast optical switches. For an integrated waveguide modulator, the half-wave voltage ($V\pi$) may be, without limitation, below 10 volts.

The second electro-optical phase modulator 112 is configured to electro-optically modulate the local oscillator optical signal 140 in the second optical waveguide signal path 136 with the radio frequency signal 116 to produce a second phase modulated optical signal 144. For the radio frequency signal 116 comprising an RF signal at a frequency $\Omega$, the second phase modulated optical signal 144 may comprise the local oscillator optical signal 140 modulated by the frequency $\Omega$.

The second optical coupler 118 is configured to optically couple the first phase modulated optical signal 142 and the second phase modulated optical signal 144 to produce an intensity modulated signal 160 comprising an RF frequency of the radio frequency electrical signal 116 mixed by a local oscillator frequency of the local oscillator signal 140 (RF stage input optical signal 140). The first signal path 134 is configured to channel the intensity modulated signal 160 as a first intensity optical signal 146 and the second signal path 136 is configured to channel the intensity modulated signal 160 as a second intensity optical signal 148. In some embodiments, a half cycle phase delay 125 may be added to the second optical waveguide signal path 138 to provide a signal inversion to drive a complementary circuit, if the photo detector 120 comprises a complementary metal oxide semi-conductor (CMOS) circuit. The first intensity optical signal 146 and the second intensity optical signal 148 may comprise the LO optical signal 140 modulated by the frequency $\Omega$.

The photo detector 120 is configured to photo-detect the first intensity optical signal 146 as a first electrical signal 162 and photo-detect the second intensity optical signal 148 as a second electrical signal 164. The photo detector 120 may comprise a semiconductor such as, for example but without limitation, silicon germanium (SiGe), a III-V compound, or other suitable material. The photo detector 120 may comprise, for example but without limitation, a single photo detector, a dual balanced photo detector, or other suitable photo detector.

The photo detector 120 comprises a first photo detector circuit 122 and a second photo detector circuit 124. The first photo detector circuit 122 receives the first intensity optical signal 146 from the first optical waveguide signal path 128, and converts the first intensity optical signal 146 to the first electrical signal 162. The second photo detector circuit 124 receives the second intensity optical signal 148 from the second optical waveguide signal path 138, and converts the second intensity optical signal 148 to the second electrical signal 164. The first electrical signal 162 and the second electrical signal 164 are combined to produce an output signal 150. The electrical signal 150 (output signal 150) may comprise the LO optical signal 140 modulated by the frequency $\Omega$, i.e., $\Delta\omega\pm\Omega$.

The photonic RF mixer function is achieved through the electro-optic interaction between the input RF signal 116 and optical heterodyne of the first optical frequency $\omega_1$ of the first laser 102 and the second optical frequency $\omega_2$ of the second laser 104. In the system 100, the difference frequency $\Delta\omega$ between $\omega_1$ and $\omega_2$ serves as an equivalent local oscillator signal 140. No electrical local oscillator is applied to the system 100. The adjustment of a constant phase bias to the electro-optical phase modulator 110/112 maximizes frequency mixing output and minimizes RF and local oscillator frequency components output. High isolation between the output intermediate frequency (IF) and RF and LO are achieved.

Those skilled in the art will understand that the various illustrative blocks, modules, circuits, and processing logic described in connection with the embodiments disclosed herein may be implemented in hardware, computer-readable software, firmware, or other combination thereof. To clearly illustrate this interchangeability and compatibility of hardware, firmware, and software, various illustrative components, blocks, modules, circuits, and steps are described generally in terms of their functionality.

In some embodiments, the system 100 may comprise any number of laser, any number of photo detectors, any number of optical couplers, any number of waveguides, any number of optical modulators, and/or any number of other modules suitable for their operation described herein. The illustrated system 100 depicts a simple embodiment for ease of description. These and other elements of the system 100 are interconnected together, allowing communication between the various elements of system 100.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present embodiment.

Figure 2:
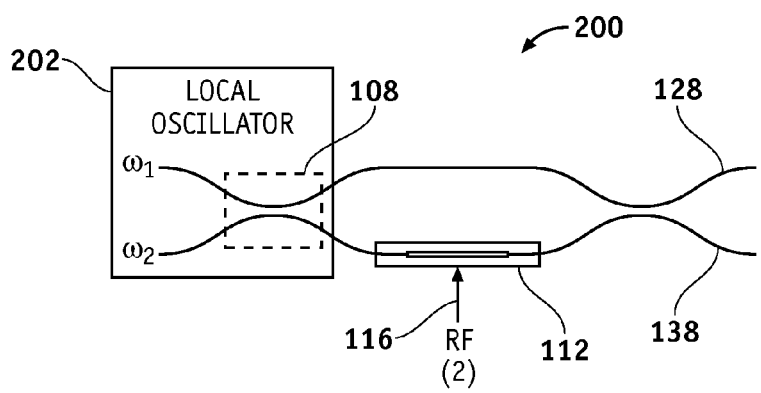
FIG. 2 is an illustration of a dual wavelength balanced (optical/RF mixing) according to an embodiment of the disclosure.

FIG. 2 is an illustration of a dual wavelength balanced device 200 (optical/RF mixing) according to an embodiment of the disclosure. Only $f_{LO} \pm n*f_{signal}$ (n=1, 2 . . . is an integer) terms are generated by the optical mixer 202 (local oscillator 202) higher order harmonics (no high order spurs) of $f_{LO}$ terms are not generated, thus producing a cleaner output, where $f_{signal}$ is $\Omega$ and $f_{LO}$ is $\Delta\omega$. The dual wavelength balanced device 200 may operate with a frequency range of $f_{signal}$ or $f_{LO}$ of, for example but without limitation, about 0.1 GHz to about 110 GHz.

Figure 3:
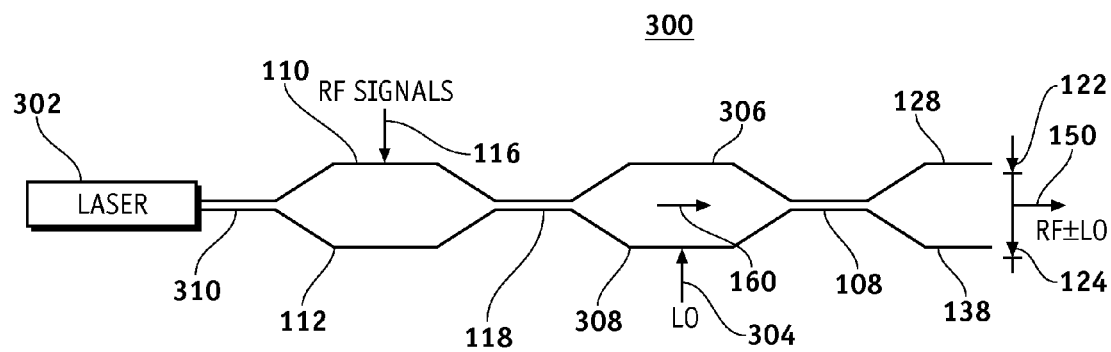
FIG. 3 is an illustration of a double balanced bridge electro-optic (EO) modulator integrated with a photonic RF oscillator according to an embodiment of the disclosure.

FIG. 3 is an illustration of a double balanced bridge EO modulator integrated with a photonic RF oscillator/mixer (system 300) according to an embodiment of the disclosure. System 300 comprises a photonic RF oscillator comprising the optical coupler 108 performing an optical mixing on a local oscillator (LO) signal 304 ($\Delta\omega$ in FIG. 1) in a separate modulation (LO) stage (306/308) from the RF modulation (RF) stage (110/112). The elements of the system 300 are discussed in conjunction with the discussion of FIG. 1 and FIG. 7. As shown and discussed in relation to FIG. 1, the RF stage may comprise a first electro-optic phase modulator such as the electro-optic phase modulator 110, a second electro-optic phase modulator such as the second electro-optic phase modulator 112, the second optical coupler 118 and other elements of the RF stage discussed in FIG. 1. The LO stage may comprise a third electro-optic phase modulator 306, a fourth electro-optic phase modulator 308, the first optical coupler 108 and other elements. In some configurations, multiple stages may be used.

In this configuration, the first signal path 128 comprises an optical waveguide that transmits light such as an optical signal 310 (laser optical signal 310) from a laser 302 into the first electro-optical phase modulator 110 and through the second optical coupler 118, the third electro-optical phase modulator 306 and the first optical coupler 108 to the photo detector 120 (photo detectors 122 and 124 in FIG. 3). The second optical path 138 comprises an optical waveguide that transmits light such as the optical signal 310 from the laser 302 into the second electro-optical phase modulator 112 and through the second optical coupler 118, the fourth electro-optical phase modulator 308 and the first optical coupler 108 to the photo detector 120 (photo detectors 122 and 124 in FIG. 3).

In this configuration, the laser 302 is configured to generate the optical signal 310 that is phase modulated with the radio frequency electrical signal 116 by the first electro-optic phase modulator 110 and the second electro-optic phase modulator 112. As shown in FIG. 3, the second optical coupler 118 is configured to optically couple the first phase modulated optical signal 142 (FIG. 1) from the first electro-optic phase modulator 110 and the second phase modulated optical signal 144 (FIG. 1) from the second electro-optic phase modulator 112 to produce the intensity modulated signal 160. In this configuration, the intensity modulated signal 160 is phase modulated with the local oscillator (LO) signal 304 by the third electro-optical phase modulator 306 and the fourth electro-optical phase modulator 308 (e.g., the third electro-optical phase modulator 306 and the fourth electro-optical phase modulator 308 are both driven by the local oscillator (LO) signal 304). Thereby, the intensity modulated signal 160 comprises an RF frequency of the radio frequency electrical signal 116 mixed by a local oscillator frequency of the local oscillator optical signal 140. In a linear system, RF modulation (RF stage) and LO modulation (LO stage) may occur in any order with a substantially same result for either order.

The system 300 which is a self-generated RF source may comprise, for example but without limitation, an opto-electronic oscillator (OEO), which comprises a fixed or a tunable oscillation frequency. In this manner, RF and LO frequency at an output of the system 300 (photonic RF mixer 300) are minimized through bias phase adjustment. The LO generation can be tuned, without an RF synthesizer, within a range of, for example but without limitation, MHz to THz covering high frequencies comprising K band to W band frequencies.

The LO signal 304 and the input RF signal 116 (RF signal 116) are further structured to use, for example but without limitation, single mode or multimode interference optical couplers such as the optical couplers 108/118 forming balance bridge output at both the LO modulator output and the RF modulator output, thereby reducing LO and RF frequency components of the output intermediate frequency (IF) signals 150 through modulator bias adjustments, reducing common mode noise at the output intermediate frequency (IF) signals 150 using balanced detectors, and increasing conversion gain at the output intermediate frequency (IF) signals 150 using balanced detectors.

The double balanced bridge electro-optic phase modulator 110/112 (electro-optic phase modulator 110/112), the photo detector 120 comprising a set of two balanced photo detector circuits 122/124, and the laser 302 (102/104 in FIG. 1) may be configured in discrete components or integrated on a single semiconductor substrate.

Figure 4:
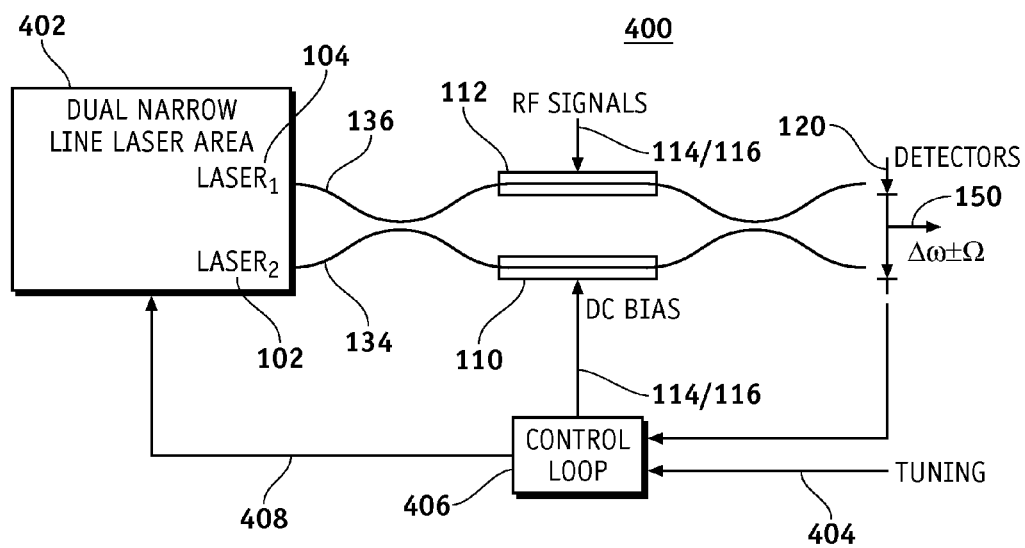
FIG. 4 is an illustration of a dual narrow line laser design integrated with a directional coupler based Mach-Zehnder (MZ) modulator and photo detectors according to an embodiment of the disclosure.

FIG. 4 is an illustration of a dual narrow line laser design integrated with a directional coupler based MZ modulator and photo detectors (system 400) according to an embodiment of the disclosure. System 400 comprises a dual narrow line laser area 402, a tuning signal 404, a control loop 406, and the elements discussed in context of discussion of FIG. 1. A DC bias 114 or thermal bias method, minimizes LO signal ($\Delta\omega$) and RF signal ($\Omega$) at output intermediate frequency (IF) signals such as the electrical signals 150. The first laser 102 and the second laser 104 are each free-running or locked to a reference signal.

Tuning one or both of the first laser 102 and the second laser 104 may be performed by an electric current, or temperature, generating the LO signal without a radio frequency synthesizer over a range of, for example but without limitation, MHz to THz, covering the high frequencies including K band to W band. A control loop 406 controls a frequency lock signal 408 and the DC bias 114 based on a tuning signal 404 and the LO signal (Δω) and RF signal (Ω). The tuning signal 404 may be obtained from a comparison of a reference signal and optical heterodyne of laser beam in optical signal paths 134 and 136. The optical heterodyne can be achieved by a number of approaches comprising, for example but without limitation, tapping optical signals from signal paths 134, 136 and combine them at a photo detector, or directly tapping the optical signal after the first coupler (e.g., tapped signal 778 in FIG. 7).

The detectors 120 may comprise a single photo detector, or a set of two balanced photo detectors (e.g., 122 and 124) remote from an output light, delivering the output lights to the set of two balanced photo detectors via a plurality of optical fibers or an optical imaging system.

Figure 5:
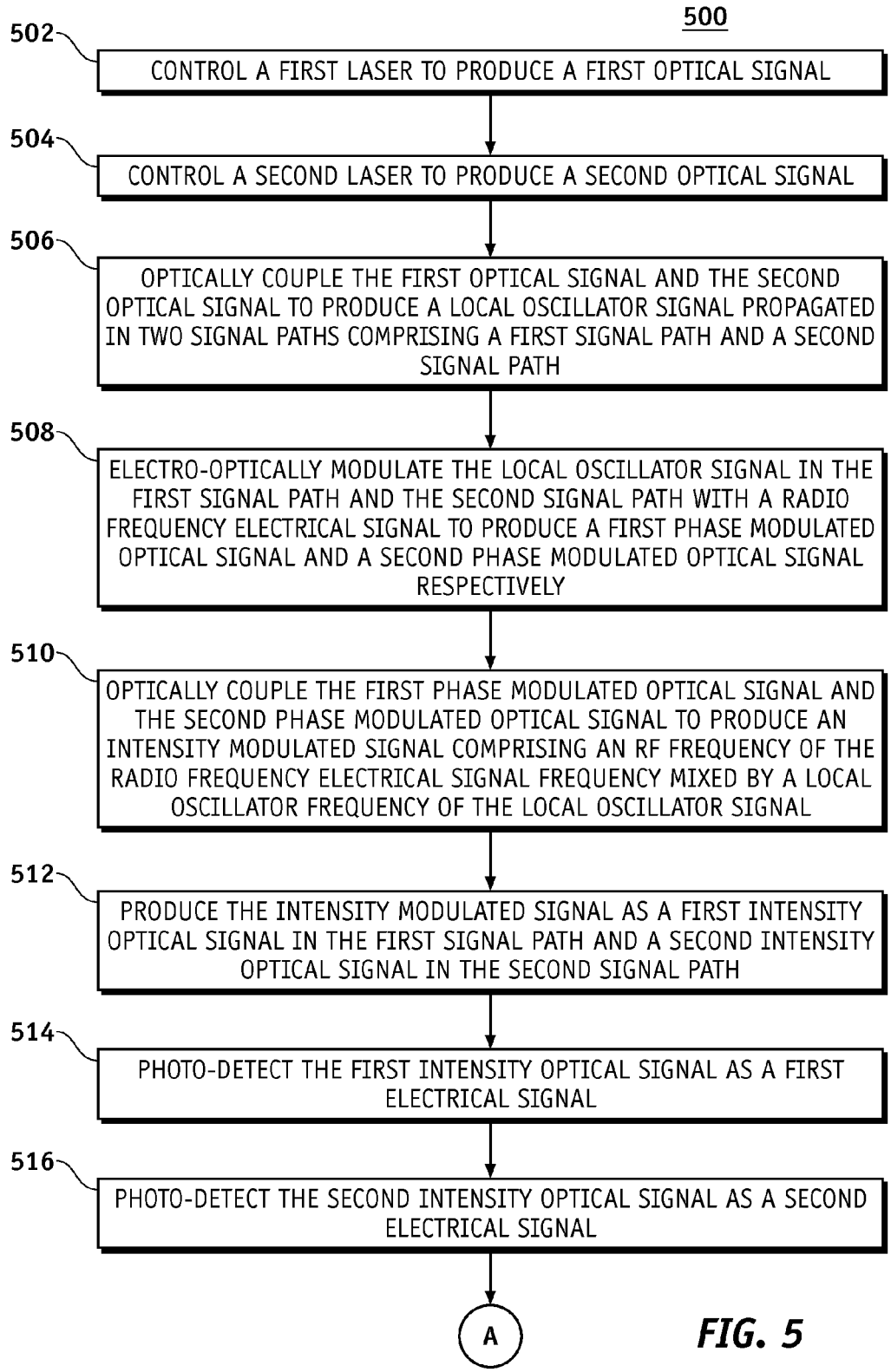
FIG. 5 is an illustration of a flowchart showing a process for electro-optical heterodyning according to an embodiment of the disclosure.
Figure 5:
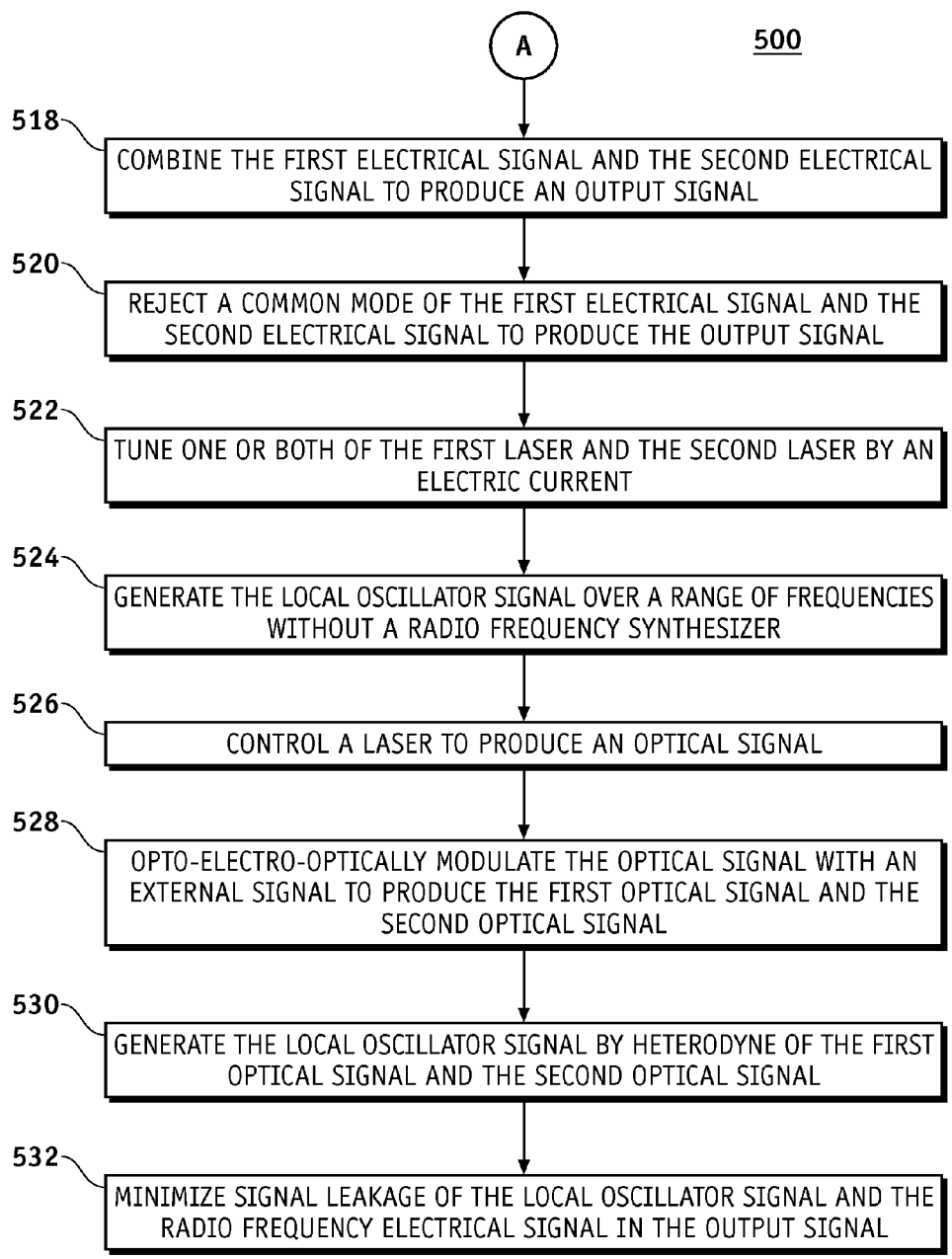

FIG. 5 is an illustration of a flowchart showing a process 500 for electro-optical heterodyning according to an embodiment of the disclosure. The various tasks performed in connection with the process 500 may be performed by software, hardware, firmware, a computer-readable medium having computer executable instructions for performing the process method, or any combination thereof. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. In some embodiments, portions of the process 500 may be performed by different elements of: the first laser 102, the second laser 104, the first optical coupler 108, the first electro-optical phase modulator 110, the second electro-optical phase modulator 112, the second optical coupler 118, the photo detector 120, etc. Process 500 may have functions, material, and structures that are similar to the embodiments shown in FIGS. 1-4 and 7. Therefore common features, functions, and elements may not be redundantly described here.

Process 500 may begin by controlling a first laser such as the first laser 102 to produce a first optical signal such as the first optical signal 130 (task 502).

Process 500 may continue by controlling a second laser such as the second laser 104 to produce a second optical signal 132 (task 504).

Process 500 may continue by optically coupling the first optical signal 130 and the second optical signal 132 to produce a local oscillator signal such as the local oscillator signal 140 propagated in two signal paths comprising a first signal path such as the first signal path 134/128 and a second signal path such as the second signal path 136/138 (task 506).

Process 500 may continue by electro-optically phase modulating the local oscillator optical signal 140 in the first signal path 134/128 and the second signal path 136/138 with a radio frequency electrical signal such as the radio frequency electrical signal 116 to produce a first phase modulated optical signal such as the first phase modulated optical signal 142 and a second phase modulated optical signal such as the second phase modulated optical signal 144 respectively (task 508).

Process 500 may continue by optically coupling the first phase modulated optical signal 142 and the second phase modulated optical signal 144 to produce an intensity modulated signal such as the intensity modulated signal 160 comprising an RF frequency of the radio frequency electrical signal 116 mixed by a local oscillator frequency of the local oscillator optical signal 140 (task 510).

Process 500 may continue by producing the intensity modulated signal 160 as a first intensity optical signal such as the first intensity optical signal 146 in the first signal path 134/128 and a second intensity optical signal such as the second intensity optical signal 148 in the second signal path 136/138 (task 512).

Process 500 may continue by photo-detecting the first intensity optical signal 146 as a first electrical signal such as the first electrical signal 162 (task 514).

Process 500 may continue by photo-detecting the second intensity optical signal 148 as a second electrical signal such as the second electrical signal 164 (task 516).

Process 500 may continue by combining the first electrical signal 162 and the second electrical signal 164 to produce an output signal such as the output signal 150 (task 518).

Process 500 may continue by rejecting a common mode of the first electrical signal 162 and the second electrical signal 164 to produce the output signal 150 (task 520).

Process 500 may continue by tuning one or both of the first laser 102 and the second laser 104 by an electric current such as the control signal 106 or frequency lock signal 408 (FIG. 4) (task 522).

Process 500 may continue by generating the local oscillator signal 140 over a range of frequencies without a radio frequency synthesizer (task 524).

Process 500 may continue by controlling a laser such as the laser 302 (e.g., FIGS. 3 and 7) to produce an optical signal such as the optical signal 310 (e.g., FIGS. 3 and 7) (task 526).

Figure 7:
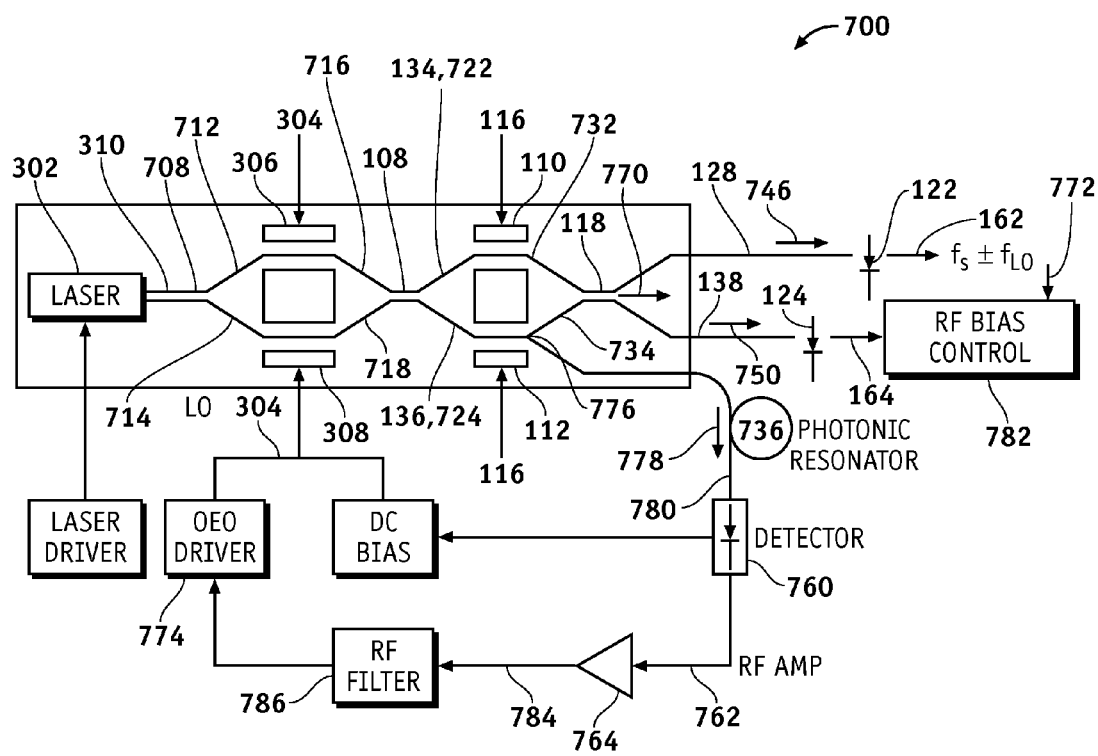
FIG. 7 is an illustration of a photonic RF mixer with integrated opto-electronic oscillator according to an embodiment of the disclosure.

Process 500 may continue by opto-electro-optically modulating the optical signal 310 with an external signal such as the external local oscillator signal 304 (e.g., FIGS. 3 and 7) to produce the first optical signal 130 and the second optical signal 132 (task 528). The external local oscillator signal 304 may be generated as shown in FIG. 7.

Process 500 may continue by generating the local oscillator optical signal 140 by heterodyne of the first optical signal 130 and the second optical signal 132 (task 530).

Process 500 may continue by minimizing signal leakage of the local oscillator signal 140 and the radio frequency electrical signal 160 of the output signal 150 (task 532).

Figure 6:
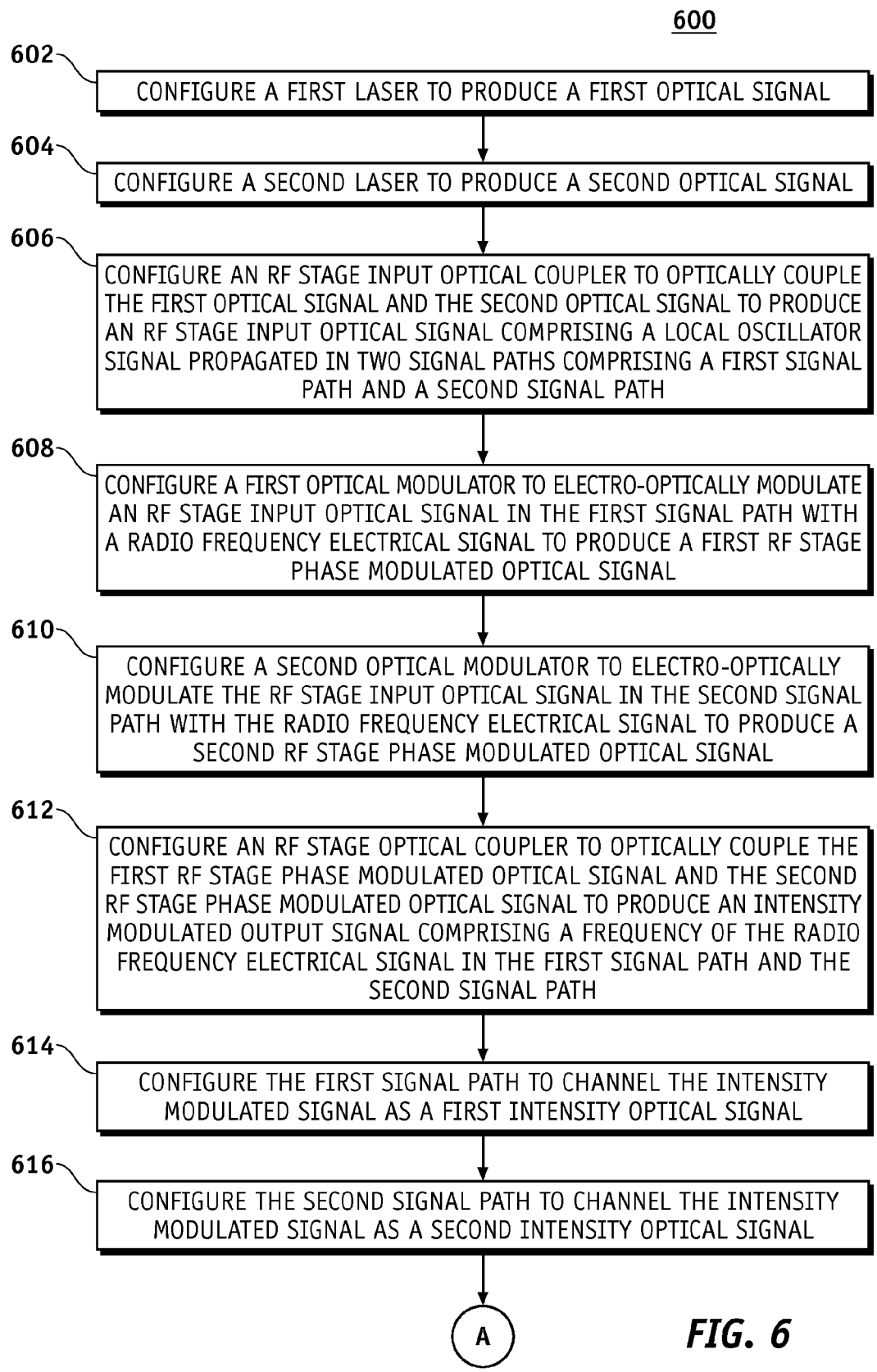
FIG. 6 is an illustration of a flowchart showing a process for producing an electro-optical modulator according to an embodiment of the disclosure.
Figure 6:
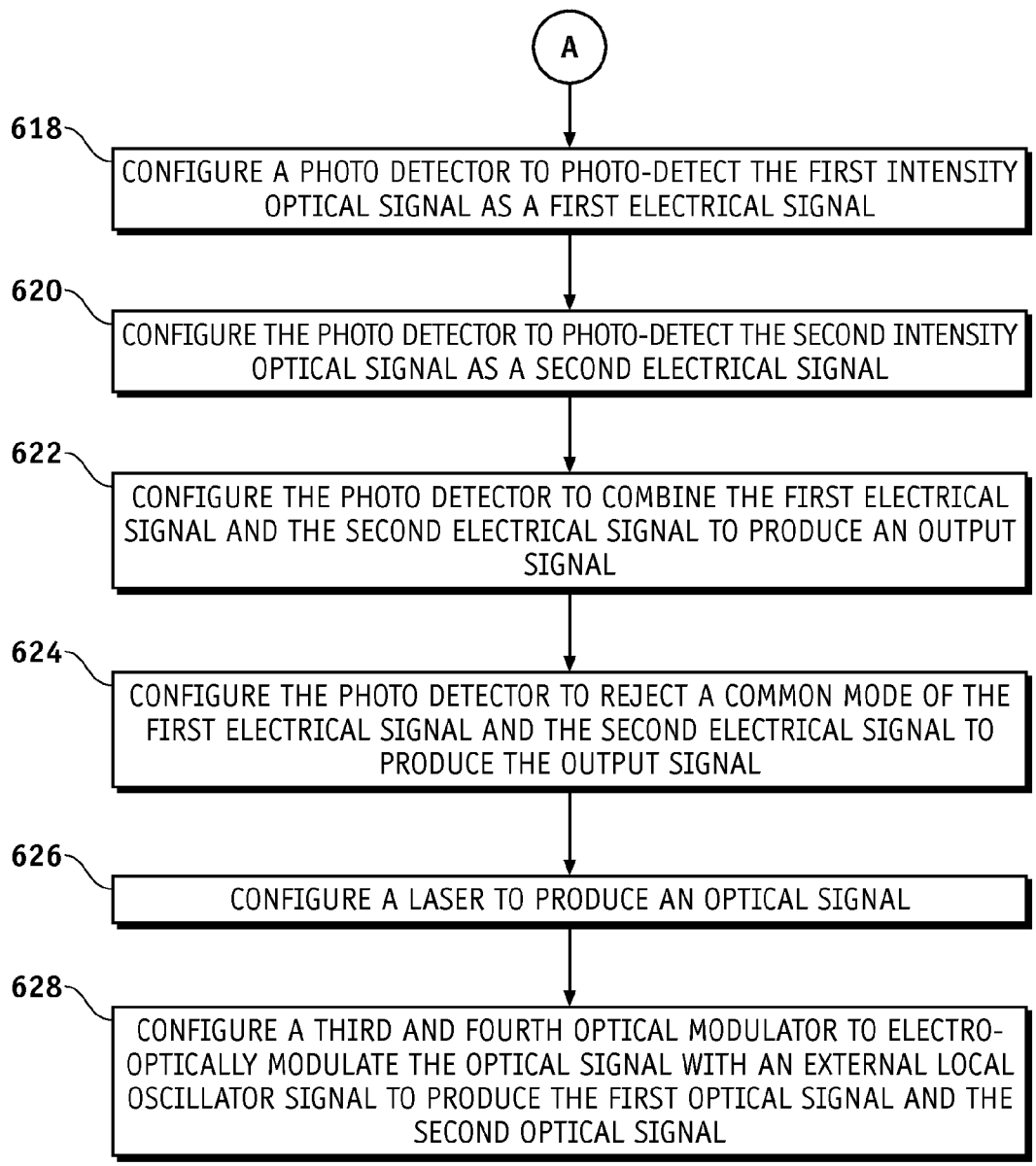

FIG. 6 is an illustration of a flowchart showing a process for producing an electro-optical modulator according to an embodiment of the disclosure. The various tasks performed in connection with the process 600 may be performed by software, hardware, firmware, a computer-readable medium having computer executable instructions for performing the process method, or any combination thereof. It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein. In some embodiments, portions of the process 600 may be performed by different elements of: the first laser 102, the second laser 104, the first optical coupler 108, the first electro-optical phase modulator 110, the second electro-optical phase modulator 112, the third electro-optical phase modulator 306, the fourth electro-optical phase modulators 308, the external local oscillator signal 304, the second optical coupler 118, the photo detector 120, etc. Process 600 may have functions, material, and structures that are similar to the embodiments shown in FIGS. 1-4 and 7. Therefore common features, functions, and elements may not be redundantly described here.

Process 600 may begin by configuring a first laser such as the first laser 102 to produce a first optical signal such as the first optical signal 130/712 (task 602).

Process 600 may continue by configuring a second laser such as the second laser 104 to produce a second optical signal such as the second optical signal 132/714 (task 604).

Process 600 may continue by configuring an RF stage input optical coupler such as the first optical coupler 108 to optically couple the first optical signal 130 and the second optical signal 132 to produce an RF stage input optical signal (e.g., the LO optical signal 140, and/or the RF stage input optical signal 722/724, FIG. 7) comprising a local oscillator signal propagated in two signal paths comprising a first signal path such as the first signal path 134/128 and a second signal path such as the second signal path 136/138 (task 606).

Process 600 may continue by configuring a first optical modulator such as the first optical modulator 110 to electro-optically modulate the RF stage input optical signal 140/722 in the first signal path 128 with a radio frequency electrical signal such as the radio frequency electrical signal 116 to produce a first RF stage phase modulated optical signal (e.g., the phase modulated optical signal 142, FIG. 1) (task 608).

Process 600 may continue by configuring a second optical modulator such as the second optical modulator 112 to electro-optically modulate the RF stage input optical signal 140/724 in the second signal path 138 with the radio frequency electrical signal 116 to produce a second RF stage phase modulated optical signal (e.g., the phase modulated optical signal 144, FIG. 1) (task 610).

Process 600 may continue by configuring an RF stage optical coupler 118 to optically couple the first RF stage phase modulated optical signal 142 and the second RF stage phase modulated optical signal 144 to produce an intensity modulated output signal such as the intensity modulated output signal 160/770 comprising a frequency of the radio frequency electrical signal 116 in the first signal path 128/134 and the second signal path 138/136 (task 612).

Process 600 may continue by configuring the first signal path 128/134 to channel the intensity modulated signal 160/770 as a first intensity optical signal such as the first intensity optical signal 146/746 (task 614).

Process 600 may continue by configuring the second signal path 138/136 to channel the intensity modulated signal 160/770 as a second intensity optical signal such as the second intensity optical signal 148/750 (task 616).

Process 600 may continue by configuring a photo detector such as the photo detector 120/122 to photo-detect the first intensity optical signal 146/746 as a first electrical signal such as the first electrical signal 162 (task 618).

Process 600 may continue by configuring the photo detector 120/124 to photo-detect the second intensity optical signal 148/750 as a second electrical signal such as the second electrical signal 164 (task 620).

Process 600 may continue by configuring the photo detector 120 to combine the first electrical signal 162 and the second electrical signal 164 to produce an output signal such as the output signal 150 (task 622).

Process 600 may continue by configuring the photo detector 120 to reject a common mode of the first electrical signal 162 and the second electrical signal 164 to produce the output signal 150 (task 624).

Process 600 may continue by configuring a laser such as the laser 302 to produce an optical signal such as the optical signal 310 (task 626).

Process 600 may continue by configuring a third and fourth optical modulator such as the third and fourth optical modulator 306/308 to electro-optically modulate the optical signal 310 with an external local oscillator signal such as the external local oscillator signal 304 to produce the first optical signal 130/712 and the second optical signal 132/714 (task 628).

FIG. 7 is an illustration of a photonic RF mixer with integrated opto-electronic oscillator 700 (system 700) according to an embodiment of the disclosure. Some of the elements of the system 700 are discussed in conjunction with the discussion of FIGS. 1 and 3. The system 700 comprises an optical splitter 708 to split an optical signal 310 into an RF stage input optical signal 722/724 fed via two equal intensity beams 712 and 714 in the first signal path 712/134/128 into the electro-optical phase modulator 306 and via the second signal path 714/136/138 into the electro-optical phase modulator 308. As shown and discussed related to FIGS. 1 and 3, the RF stage may comprise the first electro-optic phase modulator 110, the second electro-optic phase modulator 112, the second optical coupler 118 and other elements of the RF stage discussed in FIG. 1. The LO stage may comprise the third electro-optical phase modulator 306, the fourth electro-optical phase modulator 308, the first optical coupler 108 and other elements. In some configurations, multiple stages may be used.

In this configuration, the first signal path 712/134/128 comprises an optical waveguide that transmits light such as the optical signal 310 from the laser 302 into the third electro-optical phase modulator 306 and through the first optical coupler 108, the first electro-optical phase modulator 110 and the second optical coupler 118 to the photo detector 120. The second optical path 714/136/138 comprises an optical waveguide that transmits light such as the optical signal 310 from the laser 302 into the fourth electro-optical phase modulator 308 and through the first optical coupler 108, the second electro-optical phase modulator 112 and the second optical coupler 118 to the photo detector 120.

The RF stage input optical signal 712/722/714/724 propagated through two first-stage electro-optic phase modulators 306/308 respectively and are modulated by the external local oscillator (LO) signal 304 generated by an external opto-electronic oscillator 774. In this manner, the electro-optic phase modulator 306 electro-optically phase modulates the laser optical signal 310 in the first signal path 134 with the external local oscillator signal 304 to produce a first LO stage phase modulated signal 716 in the first signal path 134. Similarly, the electro-optic phase modulator 308 electro-optically phase modulates the laser optical signal 310 in the second signal path 136 with the external local oscillator signal 304 to produce a second LO stage phase modulated signal 718 in the second signal path 136.

The first LO stage phase modulated optical signal 716 and the second LO stage phase modulated optical signal 718 (two modulated beams 716 and 718) are combined by the (2×2) LO stage optical coupler 108 integrated at the end of the first-stage electro-optic phase modulators 306/308 to produce two first-stage modulated beams 722 and 724 (RF stage input optical signals 722 and 724).

The RF stage input optical signals 722 and 724 from the first (2×2) LO optical coupler 108 are coupled to an input of two second-stage electro-optic phase modulators 110/112. The RF stage input optical signals 722 and 724 are modulated by an input RF signal 116 applied to the second-stage electro-optic phase modulators 110/112 (optical modulator 110/112). In this manner, the LO stage optical coupler 108 optically couples the first LO stage phase modulated optical signal 716 and the second LO stage phase modulated optical signal 718 to produce the RF stage input optical signal 722/724 in the first signal path 134 and the second signal path 136 comprising the external local oscillator signal 304.

The external local oscillator signal 304 is external to the RF stage, but may be generate in an integrated, for example but without limitation, system, circuit or substrate as, e.g., shown in FIG. 7.

The first optical modulator 110 electro-optically modulates the RF stage input optical signal 722 in a first signal path 128 with a radio frequency electrical signal 116 to produce a first RF stage phase modulated optical signal 732. The second optical modulator 112 electro-optically modulates the RF stage input optical signal 724 in the second signal path 138 with the radio frequency electrical signal 116 to produce a second RF stage phase modulated optical signal 734.

The second stage modulated beams 732 and 734 (RF stage phase modulated optical signals 732 and 734) may be split by two (1×2) optical couplers 118 (RF stage optical coupler 118) into 4 ports. One port from a (1×2) optical coupler 118 or one port from each (1×2) RF stage optical coupler 118 may be sent to one or more high quality factor optical resonator filter 736 (optical filter 736) as a feedback input of the external local oscillator signal 304, while two other ports from each (1×2) RF stage optical coupler 118 are combined by RF stage optical coupler 118 and output through the first signal path 128 and the second signal path 138.

The RF stage optical coupler 118 optically couples the first RF stage phase modulated optical signal 732 and the second RF stage phase modulated optical signal 734 to produce an intensity modulated output signal 770 comprising a frequency of the radio frequency electrical signal 116 in the first signal path 128 and the second signal path 138. Thereby, the intensity modulated output signal 770 comprising an RF frequency of the radio frequency electrical signal 116 mixed with a local oscillator frequency of the external local oscillator signal 304.

The first signal path 128 channels the intensity modulated signal 770 as a first intensity optical signal 746 and the second signal path 138 channels the intensity modulated signal 770 as a second intensity optical signal 750.

The photo detector 122 photo-detects the first intensity optical signal 746 as a first electrical signal 162, and photo-detects the second intensity optical signal 750 as a second electrical signal 164. The photo detector 120 combines the first electrical signal 162 and the second electrical signal 164 to produce an output signal 772. The photo detector 122 rejects a common mode of the first electrical signal 162 and the second electrical signal 164 to produce the output signal 772.

The external local oscillator signal 304 may be generated by taping off the first RF stage phase modulated optical signal 732, or the second RF stage phase modulated optical signal 734 at a node 776 to produce a tapped signal 778 and sending the tapped signal 778 to a feedback opto-electronic oscillator loop 780.

An RF bias control 782 may be used to adjust optical modulators 306/308/110/112 bias to minimize leakage of the radio frequency electrical signal 116 and local oscillator signal 304 to optimize the output signal 772.

The opto-electric oscillator 774 may be tuned to generate desired local oscillator frequencies without using an external frequency synthesizer.

System 700 allows integration of an opto-electronic oscillator 340 with the double balance photonic mixer. A feedback optical signal 784 is filtered by a high quality factor RF filter 786 and received by a photo detector 760. The photo detector output 762 of the photo detector 760 is amplified by an RF amplifier 764 to form a feedback opto-electronic oscillator.

Therefore, the photonic RF mixer integrates two functions in one package. The LO signal required for frequency mixing is generated by the system 700 itself rather than from external LO source. The LO frequencies are selected by the optical and RF filters in the feedback loop. Ultra-low phase noise RF signal generation is realized in the opto-electronic oscillator 774. The optical filter 736 in the feedback opto-electronic oscillator loop 780 may be, for example but without limitation be a high quality factor micro-ring resonator, a wisper-gallery mode resonator, an integrated optical waveguide delay line, an external fiber coil delay line, or other narrow bandwidth high quality factor optical frequency selective device.

Figure 8:
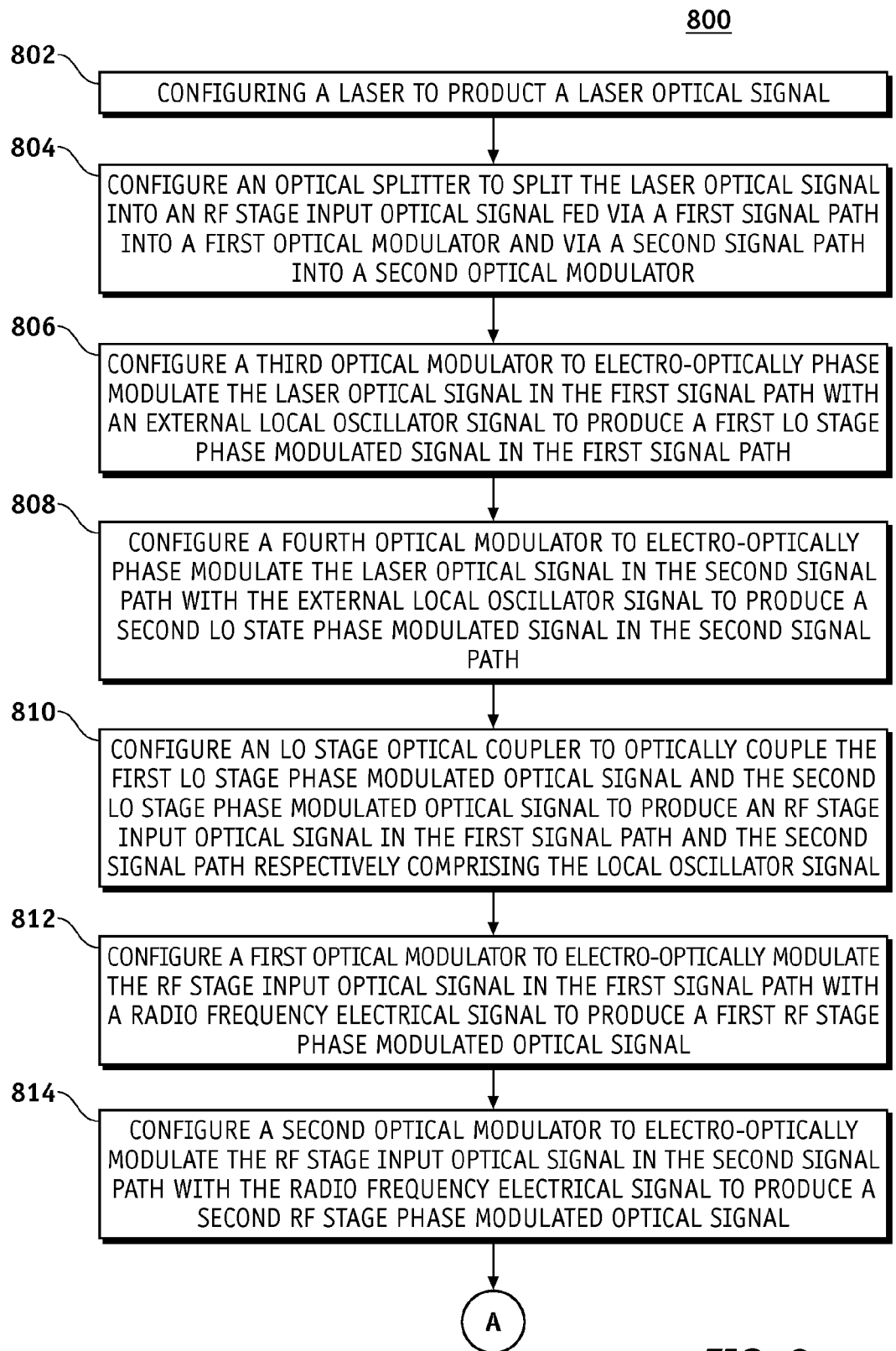
FIG. 8 is an illustration of a flowchart showing a process for producing an electro-optical modulator according to an embodiment of the disclosure.
Figure 8:
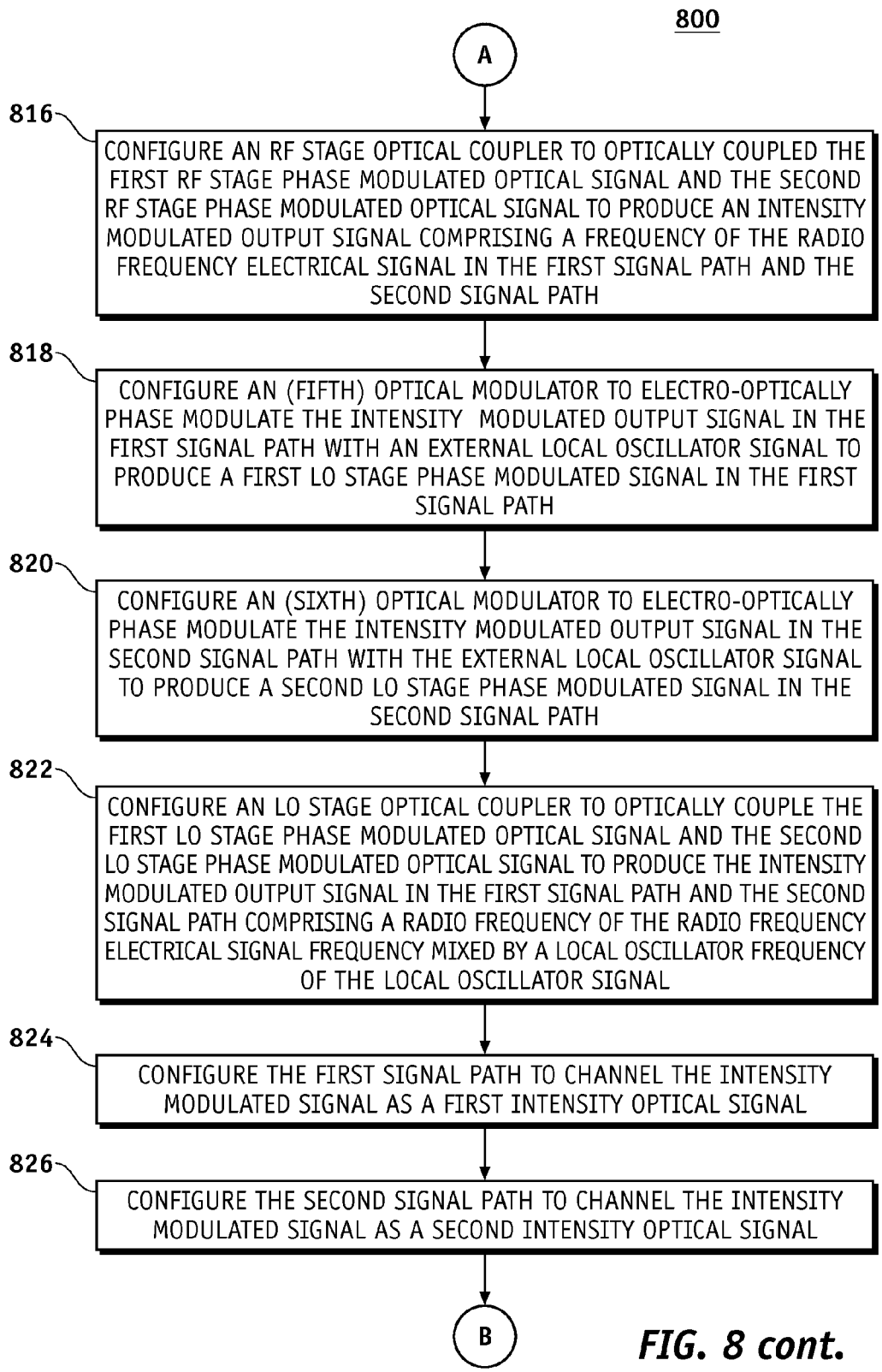
Figure 8:
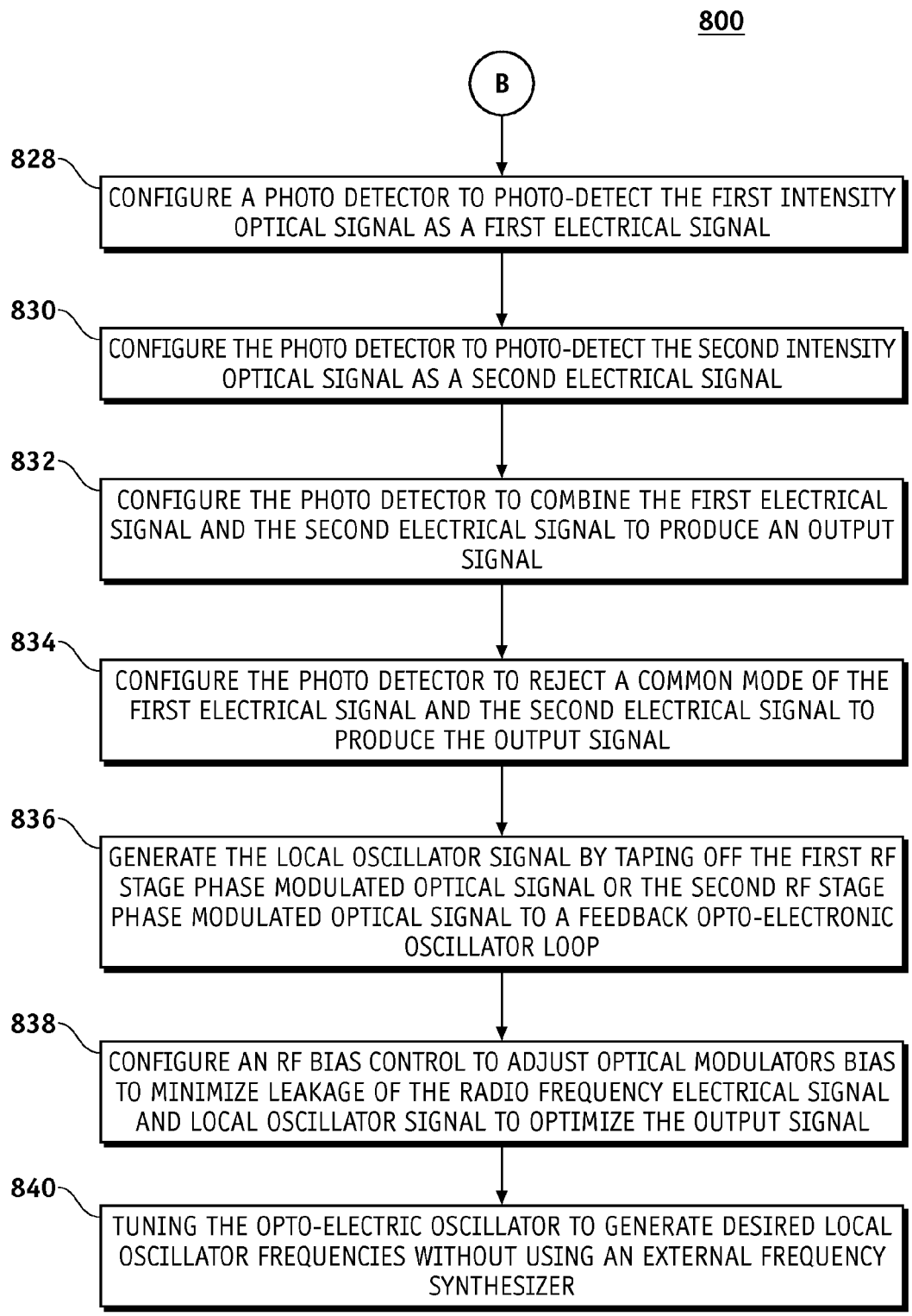

FIG. 8 is an illustration of a flowchart showing a process 800 for producing an electro-optical modulator according to an embodiment of the disclosure. The various tasks performed in connection with the process 800 may be performed by software, hardware, firmware, a computer-readable medium having computer executable instructions for performing the process method, or any combination thereof. It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein. In some embodiments, portions of the process 600 may be performed by different elements of: the laser 302, the external local oscillator signal 304, the electro-optical phase modulator 306, the electro-optical phase modulator 308, the electro-optical phase modulator 110, the electro-optical phase modulator 112, etc. Process 800 may have functions, material, and structures that are similar to the embodiments shown in FIGS. 1-4 and 7. Therefore common features, functions, and elements may not be redundantly described here.

Process 800 may begin by configuring a laser such the laser 302 (e.g., FIGS. 3 and 7) to produce a laser optical signal such as the laser optical signal 310 (task 802).

Process 800 may continue by configuring an optical splitter such as the optical splitter 708 (e.g., FIG. 7 and FIG. 7 applied to FIG. 3) to split the laser optical signal 310 into an RF stage input optical signal such as the RF stage input optical signal 140/712/714/722/724 (e.g., and as applied to FIG. 3) fed via a first signal path such as the first signal path 134 into a third optical phase modulator such as the optical phase modulator 306 and via a second signal path such as the second signal path 136 into a fourth optical phase modulator such as the optical phase modulator 308 (task 804).

Process 800 may continue by configuring the third optical modulator 306 (e.g., FIG. 7) to electro-optically phase modulate the laser optical signal 310 in the first signal path 134 with an external local oscillator signal such as the external local oscillator signal 304 to produce a first LO stage phase modulated signal such the first LO stage phase modulated signal 716 in the first signal path 134 (task 806).

Process 800 may continue by configuring the fourth optical modulator 308 (e.g., FIG. 7) to electro-optically phase modulate the laser optical signal 310 in the second signal path 136 with the external local oscillator signal 304 to produce a second LO stage phase modulated signal 718 in the second signal path 136 (task 808).

Process 800 may continue by configuring an LO stage optical coupler such as the LO stage optical coupler 108 (e.g., FIG. 7) to optically couple the first LO stage phase modulated optical signal 716 and the second LO stage phase modulated optical signal 718 to produce an RF stage input optical signal such as the RF stage input optical signal 722/724 in the first signal path 134 and the second signal path 136 respectively comprising the local oscillator signal 304 (task 810).

Process 800 may continue by configuring a first optical modulator such as the optical modulator 110 (FIGS. 1, 3 and 7) to electro-optically modulate the RF stage input optical signal 722 in the first signal path 128/134 with a radio frequency electrical signal such as the radio frequency electrical signal 116 to produce a first RF stage phase modulated optical signal such as the first RF stage phase modulated optical signal 732 (task 812).

Process 800 may continue by configuring a second optical modulator such as the optical modulator 112 (FIGS. 1, 3 and 7) to electro-optically modulate the RF stage input optical signal 724 in the second signal path 136/138 with the radio frequency electrical signal 116 to produce a second RF stage phase modulated optical signal such as the second RF stage phase modulated optical signal 734 (task 814).

Process 800 may continue by configuring an RF stage optical coupler such as the RF stage optical coupler 118 (FIGS. 1, 3 and 7) to optically couple the first RF stage phase modulated optical signal 732 and the second RF stage phase modulated optical signal 734 to produce an intensity modulated output signal such as the intensity modulated output signal 160/770 comprising a frequency of the radio frequency electrical signal 116 in the first signal path 128 and the second signal path 138 (task 816).

Process 800 may continue by configuring an (fifth) optical modulator such as the optical modulator 306 (e.g., FIG. 3) to electro-optically phase modulate the intensity modulated output signal 160/770 in the first signal path 128/134 with the external local oscillator signal 304 to produce a first LO stage phase modulated signal (e.g., in a similar manner to the first LO stage phase modulated signal 716 shown in FIG. 7) in the first signal path 128/134 (task 818).

Process 800 may continue by configuring an (sixth) optical modulator such as the optical modulator 308 (e.g., FIG. 3) to electro-optically phase modulate the intensity modulated output signal 160/770 in the second signal path 138/136 with the external local oscillator signal 304 to produce a second LO stage phase modulated signal (e.g., in a similar manner to the second LO stage phase modulated signal 718 shown in FIG. 7) in the second signal path 138/136 (task 820).

Process 800 may continue by configuring an LO stage optical coupler such as the first optical coupler 108 (FIG. 3) to optically couple the first LO stage phase modulated optical signal (e.g., similar to the first LO stage phase modulated signal 716 shown in FIG. 7) and the second LO stage phase modulated optical signal (e.g., in a similar manner to the second LO stage phase modulated signal 718 shown in FIG. 7) to produce the intensity modulated output signal 160/770 in the first signal path 128/136 and the second signal path 138/136 comprising a radio frequency of the radio frequency electrical signal frequency such as the radio frequency signal 116 mixed by a local oscillator frequency of the local oscillator signal 160 (task 822).

Process 800 may continue by configuring the first signal path 128 to channel the intensity modulated signal 770 as a first intensity optical signal such as the first intensity optical signal 746 (task 824).

Process 800 may continue by configuring the second signal path 138 to channel the intensity modulated signal 770 as a second intensity optical signal such as the second intensity optical signal 750 (task 826).

Process 800 may continue by configuring a photo detector 122 such as the photo detector 122 to photo-detect the first intensity optical signal 746 as a first electrical signal such as the first electrical signal 162 (task 828).

Process 800 may continue by configuring the photo detector 122 to photo-detect the second intensity optical signal 750 as a second electrical signal such as the second electrical signal 164 (task 830).

Process 800 may continue by configuring the photo detector 122 to combine the first electrical signal 162 and the second electrical signal 164 to produce an output signal such as the output signal 772 (task 832).

Process 800 may continue by configuring the photo detector 122 to reject a common mode of the first electrical signal 162 and the second electrical signal 164 to produce the output signal 772 (task 834).

Process 800 may continue by generating the local oscillator signal 304 by taping off the first RF stage phase modulated optical signal 732, or the second RF stage phase modulated optical signal 734 at a node such as node 776 to produce a tapped signal such as the tapped signal 778 and sending the tapped signal 778 to a feedback opto-electronic oscillator loop such as the feedback opto-electronic oscillator loop 780 (task 836).

Process 800 may continue by configuring an RF bias control 782 to adjust optical phase modulators 306/308/110/112 bias to minimize leakage of the radio frequency electrical signal 116 and local oscillator signal 304 to optimize the output signal 772 (task 838).

Process 800 may continue by tuning the opto-electric oscillator 774 to generate desired local oscillator frequencies without using an external frequency synthesizer (task 840).

In this manner, embodiments of the disclosure provide systems and methods for electro-optical frequency conversion and mixing.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according the embodiments of the present disclosure.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-4 and 7 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for electro-optical heterodyning, the method comprising:
   optically coupling a first optical signal and a second optical signal to produce a local oscillator signal propagated in two signal paths comprising a first signal path and a second signal path;
   electro-optically phase modulating the local oscillator signal in the first signal path and the second signal path with a radio frequency electrical signal to produce a first phase modulated optical signal and a second phase modulated optical signal respectively;
   optically coupling the first phase modulated optical signal and the second phase modulated optical signal to produce an intensity modulated signal comprising an RF frequency of the radio frequency electrical signal frequency mixed by a local oscillator frequency of the local oscillator signal, wherein the intensity modulated signal is produced as a first intensity optical signal in the first signal path and a second intensity optical signal in the second signal path;
   photo-detecting the first intensity optical signal as a first electrical signal;
   photo-detecting the second intensity optical signal as a second electrical signal;
   combining the first electrical signal and the second electrical signal to produce an output signal; and
   rejecting a common mode of the first electrical signal and the second electrical signal to produce the output signal.

2. The method of claim 1, further comprising:
   controlling a first laser to produce the first optical signal; and
   controlling a second laser to produce the second optical signal.

3. The method of claim 2, further comprising:
   tuning one or both of the first laser and the second laser by an electric current; and
   generating the local oscillator signal over a range of frequencies without a radio frequency synthesizer.

4. The method of claim 1, further comprising:
   controlling a laser to produce an optical signal; and
   electro-optically phase modulating the optical signal with an external signal to produce the first optical signal and the second optical signal.

5. The method of claim 1, further comprising generating the local oscillator signal by heterodyne of the first optical signal and the second optical signal.

6. The method of claim 1, further comprising generating the output signal while providing high isolation of the local oscillator signal and the radio frequency electrical signal.

7. The method of claim 6, further comprising minimizing signal leakage of the local oscillator signal and the radio frequency electrical signal of the output signal.

8. A system for electro-optical frequency conversion and mixing, the system comprising:
   a first optical coupler configured to optically couple a first optical signal and a second optical signal to produce a local oscillator signal propagated in two signal paths comprising a first signal path and a second signal path respectively;
   a first electro-optical modulator configured to electro-optically modulate the local oscillator signal in the first signal path with a radio frequency electrical signal to produce a first phase modulated optical signal;
   a second electro-optical modulator configured to electro-optically modulate the local oscillator signal in the second signal path with the radio frequency electrical signal to produce a second phase modulated optical signal;
   a second optical coupler configured to optically couple the first phase modulated optical signal and the second phase modulated optical signal to produce an intensity modulated signal comprising a radio frequency of the radio frequency electrical signal mixed by a local oscillator frequency of the local oscillator signal, wherein the first signal path configured to channel the intensity modulated signal as a first intensity optical signal and the second signal path configured to channel the intensity modulated signal as a second intensity optical signal; and a photo detector configured to:
  photo-detect the first intensity optical signal as a first electrical signal;
  photo-detect the second intensity optical signal as a second electrical signal;
  combine the first electrical signal and the second electrical signal to produce an output signal; and
  reject a common mode of the first electrical signal and the second electrical signal to produce the output signal.

9. The system of claim 8, further comprising:
a first laser configured to produce the first optical signal; and
a second laser configured to produce the second optical signal.

10. The system of claim 8, further comprising:
a laser configured to produce a laser optical signal; and
a third and fourth optical modulator optically coupled to the first optical coupler, and configured to electro-optically modulate the laser optical signal with an external local oscillator signal to produce the first optical signal and the second optical signal.

11. A method for producing an electro-optical modulator, the method comprising:
configuring a first optical modulator to electro-optically modulate an RF stage input optical signal in a first signal path with a radio frequency electrical signal to produce a first RF stage phase modulated optical signal;
configuring a second optical modulator to electro-optically modulate the RF stage input optical signal in a second signal path with the radio frequency electrical signal to produce a second RF stage phase modulated optical signal;
configuring an RF stage optical coupler to optically couple the first RF stage phase modulated optical signal and the second RF stage phase modulated optical signal to produce an intensity modulated output signal comprising a frequency of the radio frequency electrical signal in the first signal path and the second signal path;
configuring the first signal path to channel the intensity modulated output signal as a first intensity optical signal;
configuring the second signal path to channel the intensity modulated output signal as a second intensity optical signal;
configuring a photo detector to photo-detect the first intensity optical signal as a first electrical signal;
configuring the photo detector to photo-detect the second intensity optical signal as a second electrical signal;
configuring the photo detector to combine the first electrical signal and the second electrical signal to produce an output signal; and
rejecting a common mode of the first electrical signal and the second electrical signal to produce the output signal.

12. The method of claim 11, further comprising:
configuring a first laser to produce a first optical signal;
configuring a second laser to produce a second optical signal; and
configuring an RF stage input optical coupler to optically couple the first optical signal and the second optical signal to produce the RF stage input optical signal comprising a local oscillator signal propagated in two signal paths comprising the first signal path and the second signal path.

13. The method of claim 11, further comprising:
configuring a laser to produce a laser optical signal; and
configuring an optical splitter to split the laser optical signal into the RF stage input optical signal fed via the first signal path into the first optical modulator and via the second signal path into the second optical modulator.

14. The method of claim 13, further comprising:
configuring a third optical modulator to electro-optically phase modulate the laser optical signal in the first signal path with an external local oscillator signal to produce a first LO stage phase modulated signal in the first signal path;
configuring a fourth optical modulator to electro-optically phase modulate the laser optical signal in the second signal path with the external local oscillator signal to produce a second LO stage phase modulated signal in the second signal path; and
configuring an LO stage optical coupler to optically couple the first LO stage phase modulated signal and the second LO stage phase modulated signal to produce the RF stage input optical signal in the first signal path and the second signal path comprising a local oscillator signal.

15. The method of claim 11, further comprising:
configuring a fifth optical modulator to electro-optically phase modulate the intensity modulated output signal in the first signal path with an external local oscillator signal to produce a first LO stage phase modulated signal in the first signal path;
configuring a sixth optical modulator to electro-optically phase modulate the intensity modulated output signal in the second signal path with the external local oscillator signal to produce a second LO stage phase modulated signal in the second signal path; and
configuring an LO stage optical coupler to optically couple the first LO stage phase modulated signal and the second LO stage phase modulated signal to produce the intensity modulated output signal in the first signal path and the second signal path comprising a radio frequency of the radio frequency electrical signal frequency mixed by a local oscillator frequency of the local oscillator signal.

* * * * *